G. C. BEIDLER.
PHOTOGRAPHING APPARATUS.
APPLICATION FILED DEC. 2, 1912.

1,272,190.

Patented July 9, 1918.

WITNESSES
Pearl Putnam.
L. E. Barkley.

INVENTOR
George C. Beidler,
by Frank S. Appleman
Attorney

WITNESSES
Pearl Putnam.
L. C. Barkley

INVENTOR
George C. Beidler,
Frank S. Appleman
Attorney

UNITED STATES PATENT OFFICE.

GEORGE C. BEIDLER, OF ROCHESTER, NEW YORK.

PHOTOGRAPHING APPARATUS.

1,272,190. Specification of Letters Patent. Patented July 9, 1918.

Application filed December 2, 1912. Serial No. 734,552.

*To all whom it may concern:*

Be it known that I, GEORGE C. BEIDLER, a citizen of the United States of America, and resident of Rochester, in the county of Monroe and State of New York, have invented certain new and useful Improvements in Photographing Apparatus, of which the following is a specification.

This invention relates to photography and it has relation particularly to apparatus designed for photographing on film which is thereafter subjected to the action of developing fluids, preferably within the apparatus, although the present invention does not deal with the means or mechanism for feeding the film, for severing the same, nor for subjecting the said film to the developing fluids.

An object of the present invention is to provide novel means for simultaneously photographing the two sides of a page of a book or a sheet or the like on a single piece of sensitized material having both of its surfaces sensitized in order that the contents of one side of the page or sheet photographed may be photographically reproduced on one side of the sensitized material and the contents of the opposite side of the page or sheet being taken being likewise photographically reproduced on the opposite side of the film which contains the image or reproduction of the side of the sheet first mentioned; a further object of this invention is the provision of novel means for obtaining a focus of the lens or lenses in the plane on which the film is held when the exposure takes place, in order that when a plurality of lenses are employed, as in the present instance, it may be determined whether the said lenses are of the same identical focus; in other words, it is the object of the present invention to use what are usually termed "matched" lenses for projecting the images or pictures to the coated surfaces of the film.

A still further object of this invention is to produce an apparatus designed to photograph two sides of a film simultaneously, novel means being provided for holding the copy or object to be photographed in order that the two sides of the sheet, page or object may be held in such position with relation to the lenses that they may project the image to the sensitized surfaces of the film, the present invention contemplating the provision of means, such as prisms and reflectors for first reversing and then erecting the image, the invention furthermore contemplating the provision of novel means for photographing, on the two sensitized sides of a sheet, the opposite pages of a book when such process or proceeding is desirable, especially in photographing deeds and instruments of that character, to reproduce photographically the two sides of the said deed or legal instrument and the like on both sides of a single sheet of sensitized material simultaneously.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
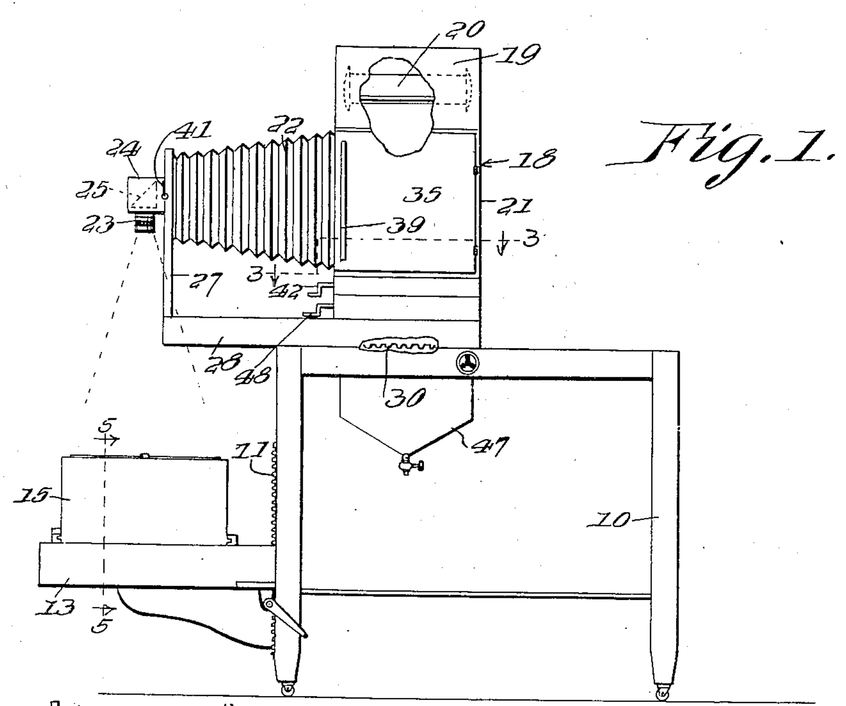
Figure 1 illustrates a view in elevation of the apparatus embodying the invention.
Figures 2, 3:
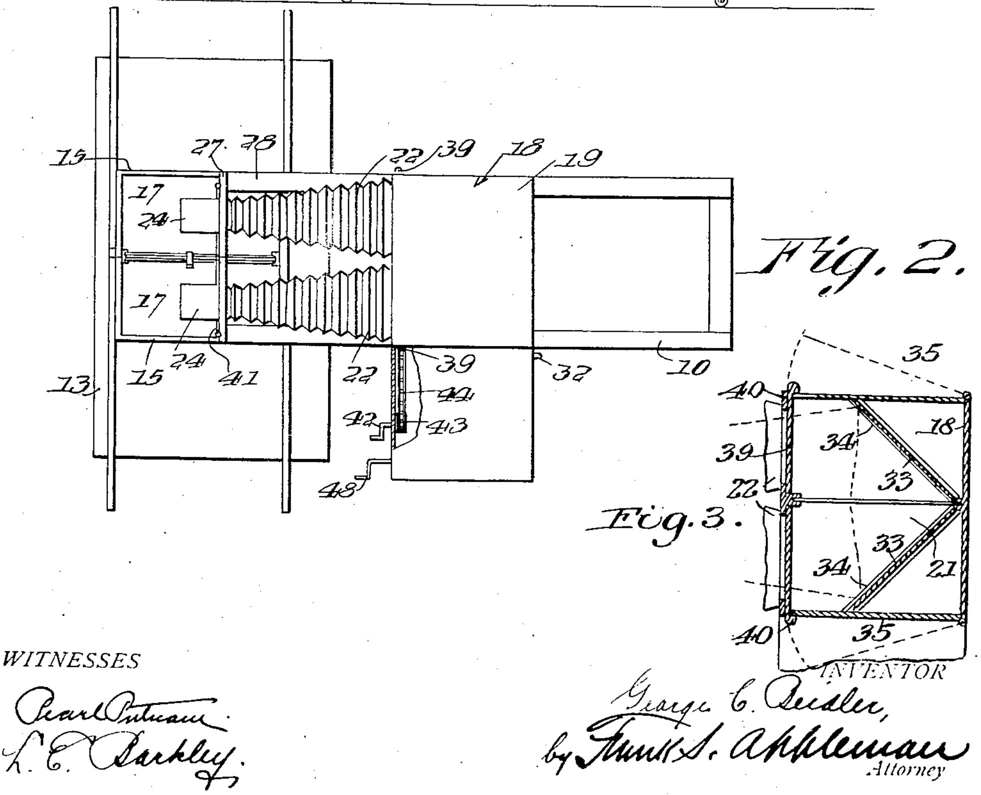
Fig. 2 illustrates a plan view thereof.
Fig. 3 illustrates a horizontal section through the exposing chamber on the line 3—3 of Fig. 1.
Figures 4, 6, 7:
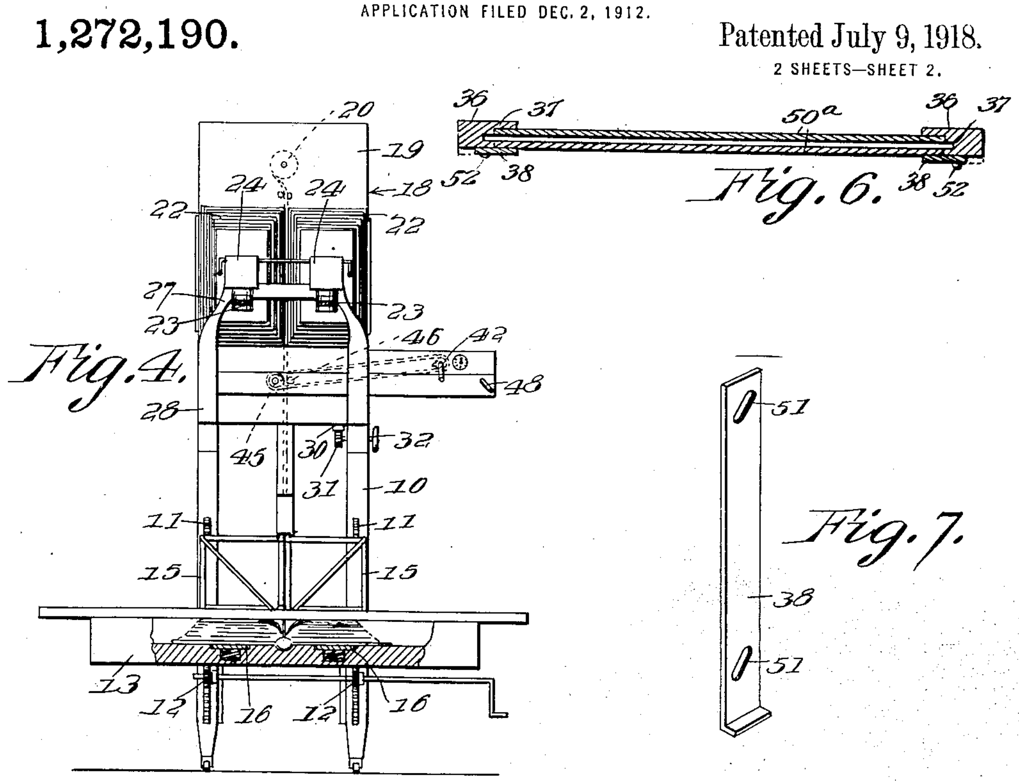
Fig. 4 illustrates a front view of the apparatus.
Fig. 6 illustrates in detail a horizontal section through the guide for the sensitized film and ground glass.
Fig. 7 illustrates in detail the holding clip of the guide for the sensitized film or ground glass.

In these drawings 10 denotes a frame forming a support for the means for holding the object or objects to be copied and the apparatus which coacts therewith for photographing the image. The frame has two racks 11, 11, which are engaged by pinions 12 of the copy or article holder, which copy or article holder is here shown as comprising a base 13 movable through the medium of the pinions and rack vertically of the frame. A portion of the base is provided with grooves 14 in which the frames 15 are slidable, the copy or article holder under the frames being supplied with yieldable supports 16 for holding a book in an open position in order that a page thereof at a time may be held in a vertical position by the sliding frames 15. Where it is desired to copy a deed or other legal paper or instrument, loose leaves of any kind or other copy which is not bound in book form, the sheets may be placed between the sliding frames and there held in vertical position while they are exposed to the action of the lenses and the apparatus associated with them.

I have heretofore referred to the holder as designed for holding copy or articles and while I shall hereinafter refer to the said device for holding the copy or articles as a copy holder, I mean thereby a device for supporting or holding any article which is to be photographed, whether it be a book, map, chart, legal instrument or other device containing characters to be photographed, which will be hereafter referred to as "copy."

In further description of the copy holder, it is to be observed that the sliding frames are of such construction as to support reflectors 17, preferably ordinary mirrors at an angle of substantially 45° with respect to the sides of the frame which sides coact with each other for the purpose of holding the copy in substantially vertical position so that the said reflectors which are inclined toward each other at angles of substantially 45° with respect to the sides of the frame will be in position to reflect the copy held between the two frames, or the glass plates A forming the sides of the frames.

Mounted on the frames 10 is a casing 18 which for convenience in practice may be divided into compartments and while I have referred to the structure which is mounted on the frame as a casing it may be regarded as a box-like structure in sections or not, as the requirement of practice dictate and therefore by the term "casing" I wish to be understood as meaning any structure which may be mounted on a frame capable of containing a mechanism for subjecting the film to the action of actinic light, regardless of the structure thereof but for the purposes of disclosing an operative device and one form of the invention, I have illustrated the said casing as being associated with or having a source of film supply 19 containing a roll 20 of sensitized material, preferably sheets of flexible material having both of its sides photographically sensitized. I furthermore associate with the casing a means for drawing the film from the source of supply through a chamber 21 which may be regarded as an exposing chamber, the arrangement being such that the film occupies a plane substantially in the transverse center of the said exposing chamber. The exposing chamber is in communication with a camera bellows 22, one of which is attached to the casing, so that it will communicate with the interior thereof on one side of the transverse center of the casing and the other one will be located on the opposite side of the said transverse center.

As will be observed from an inspection of the drawing the lenses are exposed downwardly and are in positions over the frames of the copy holder which carry the reflectors so that the images reflected thereby are projected by the lenses to the exposing chamber on opposite sides of the film.

In order to direct the image projected by the lenses to the sensitized surfaces of the film, the exposing chamber contains, on opposite sides of the film, the sliding mirrors or reflectors 33 arranged at such angles with relation to the surfaces of the film as to direct the said images thereto. For the purpose of holding the reflectors in the exposing chamber, the upper and lower walls of the said chamber are here shown as provided with channeled strips 34 forming ways in which the edges of the reflectors may move and by which the said reflectors may be held.

It is especially desirable that these reflectors be removably applied to the exposing chamber for such provision enables the operator to remove the said reflectors for the purpose of having a clear view of the interior of the exposing chamber when it is necessary to focus the lenses.

For the purpose of providing access to the interior of the casings for the purpose mentioned, that is to say for focusing the lenses, each end of the casing has a door 35 so hinged to the casing as to permit it to swing to an open position. When the operator wishes to adjust the lenses to insure correct focusing, one of the reflectors is removed from the exposing chamber and a ground glass is inserted in the exposing chamber so that it will occupy the plane which is usually occupied by the sensitized material, the door on the end of the exposing chamber from which the reflector has been removed is open and by observation through the said opening, the action of the lens which is to project the image on the side of the sensitized material opposite the open door may be observed.

Usually it would be found necessary to focus but one of the lenses since the lenses are matched as heretofore stated. As a means for retaining the ground glass in position while the focusing operation is being carried on, the exposing chamber is provided with internal flanges 36 rabbeted to form seats 37 for the ground glass, the ground glass being held in such seats through the medium of the clips 38 which are slidable on the flanges and adapted to engage the ground glass.

The recesses formed by rabbeting the flanges are also utilized as guiding ways in which the sensitized material may travel within the exposing chamber, said flanges being also capable of retaining glass plates between which the sensitized material may be drawn.

In apparatus employing sensitized material on rolls or spools, provision is usually made for tensioning the roll or spool so that when the feeding means draws the film or sensitized material from the spool through the exposing chamber, the said sensitized material is held sufficiently taut to prevent buckling or bulging and the said sensitized material is usually so held in the focal plane so that retaining glass may in most instances be omitted, although in the present embodiment of the invention, provision is made for retaining the sensitized material between glass plates should it be found desirable.

There is a provision for shutting off the light which is accessible to the exposing chamber on each side of the film, the said means constituting shutters or dark slides 39 which may be moved within slots 40, the said dark slides being of any ordinary type and operating in substantially the ordinary way.

The lens boxes are provided with shutters of any approved pattern which may be simultaneously operated through the medium of the rod 41 connecting the two shutters and projecting them within reach of an operator.

The crank 42 turns a sprocket wheel 43 and drives a sprocket chain 44 which rotates the feed roller shaft 45. The feed roller shaft 45 drives the feed roller 46 so that the film is drawn from the roll 20 and after it is duly exposed, delivers it to the receptacle 47 which is adapted to contain fluid to act on the coated surface of the film.

The crank 48 may be provided with means of any appropriate type for drawing film from the receptacle 47 but as the present invention may operate in conjunction with any form of film drawing and developing apparatus, said apparatus is not here described in detail.

The frames 15 are limited in their movement with relation to the base 13 by a stop block 49 against which the frames abut, one of the said frames having a recess 50 to receive the stop block so that the frames may move close together for clamping the copy therebetween.

Figure 5:
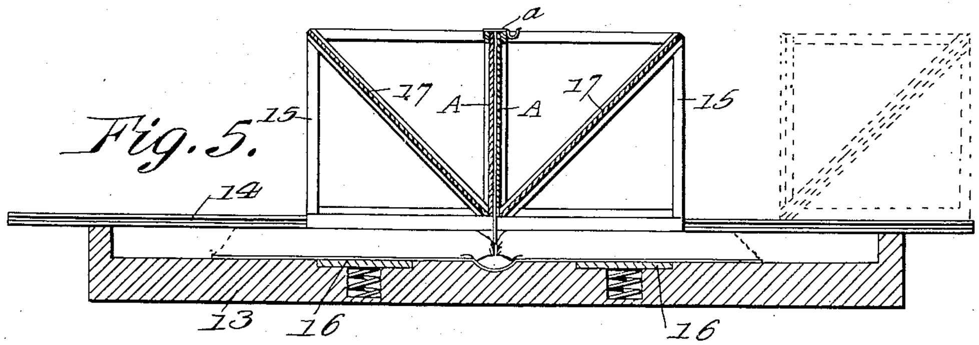
Fig. 5 illustrates a vertical section in detail of the copy holder on the line 5—5 of Fig. 1.
Figure 8:
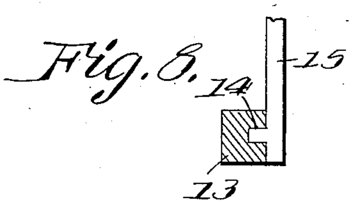
Fig. 8 illustrates in detail the slide of copy holder.
Figure 9:
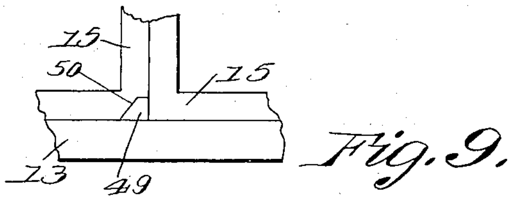
Fig. 9 illustrates in detail the stop on copy holder.

As has been stated, the glass plates A, shown in Fig. 5 hold the copy therebetween and for the purpose of retaining the sliding frames 15 in position to clamp or retain the copy between the glass plates A, a clip *a* is caused to embrace the adjacent portions of the frames 15 and this clip is illustrated solely to show one embodiment of such a device, designed to accomplish the result.

The flanges 36 have been described as provided for containing ground glass during the process of focusing, but the said flanges may also contain transparent glass plates $50^a$ slightly separated to permit the passage of the film therebetween, although said glass plates will not always be required and may, under certain conditions be dispensed with without affecting the operation of the device.

The clips 38 heretofore described are provided with cam slots 51 which receive the ears 52 seated in the flanges 36 so that as the clips are raised and lowered, they are caused to travel away from or toward the planes of the inner edges of the flanges 36 so that they will engage or disengage the glass plates $50^a$ for holding the same in place.

The rack 30 on the lower surface of the case is engaged by a toothed wheel 31 for moving the casing in focusing and the wheel is rotated by the hand wheel 32.

The foregoing specification includes the use of the terms "film" and "sensitized material" and as the apparatus relates to the subject of photography, the term film or sensitized material is intended to embrace any material which is photographically sensitized, coated or otherwise treated to be affected by actinic light.

From the foregoing description, it will be seen that the book may lie in an open position while the two sides of any one leaf are so held as to be exposed and the said exposed sides reflected, the said result being attained by the copy holder, the construction of which is described. The casing which is provided to contain the sensitized element has associated with it means for exposing the sensitized element to light. Both sides of the element are sensitized and therefore provision is made for exposing both sides simultaneously so that the two sides of the exposed page may be photographed on the sensitized element. The sensitized element is drawn through the casing or the exposing chamber thereof and in practice, the exposed portions of the film may be treated for the purpose of developing and fixing the image thereon, but as the developing means does not form a part of the present invention, it is not described in detail. In focusing the apparatus, any appropriate means may be provided for moving the casing containing the sensitized element with relation to the lens or vice versa. The reflectors contained within the casing direct the rays of light to the sensitized element, and by the arrangement of parts, the two sides of the page are reproduced on the two sensitized surfaces of the element.

I claim:

1. A casing, means associated therewith for exposing opposite sides of a double coated film photographically including reflectors, means for movably holding the reflectors in the casing thereby permitting the removal of a reflector for observing the projected image reflected by the opposite reflector, said casing having openings through which the focusing can be observed, and means for holding a screen substantially in the plane occupied by the film against which the projected image is reflected.

2. In a photographing apparatus, means for photographically exposing two sides of a film, and a copy holder operating in conjunction with the photographing apparatus, said copy holder having means for displaying both sides of a sheet containing copy held thereby to the means for photographically exposing the film.

3. In a photographing apparatus, means for photographically exposing a film which has two sensitized sides, in combination with a copy holder having means for holding a sheet, and means associated therewith for simultaneously displaying both sides of the sheet to the means for photographing the said copy.

4. In a photographing apparatus, a copy holder comprising a base, frames slidable horizontally for clamping the copy between them and displaying copy from each side of the frame, means for reflecting the said copy, and a photographing apparatus containing material sensitized on two sides, said photographing apparatus having means for projecting said copy to the two sensitized sides of the film.

5. In a photographing apparatus having means for holding material sensitized on two sides whereby both sides may be simultaneously exposed to light, a copy holder displaying both sides of the copy and means for reflecting the light rays from opposite sides of the copy to opposite sides of the sensitized material.

6. In a photographing apparatus, means for holding material sensitized on two sides whereby both sides may be simultaneously exposed to light, means for photographically exposing both sides of the said sensitized material, and a copy holder adapted to support a book in an open position, means associated therewith for holding a leaf of the book at an angle to the open position of the book, and means for reflecting the angularly held leaf whereby said reflection is exposed to the means for exposing the film to light.

7. In an apparatus relating to photography, means for holding a book in an open position, means associated therewith for holding a leaf of the book at an angle with relation to the position of the book when open, means for reflecting both sides of the said page, means for projecting the reflected page and means containing the sensitized material with which the means for projecting the reflected matter operates.

8. In a photographing and developing apparatus, a light tight chamber, means for supporting a sensitized film therein so that picture areas on opposite sides of the film are free, means for holding a sheet to expose opposite sides thereof, means for focusing light rays, from one side of the sheet on to one side of the film, and means for focusing light rays from the opposite side of the sheet on to the opposite side of the film.

9. In an apparatus relating to photography, means for holding a book in an open position, means associated therewith for holding a leaf of the book at an angle with relation to the position of the book when open, means for reflecting both sides of the said page, means for projecting the reflected matter, and a sensitized element on to which the reflected matter is projected.

10. In an apparatus relating to photography, means for holding a book in an open position, members movable across the open face of a book and adapted to hold a leaf of the book therebetween, and means for reflecting the sides of the leaf held between the movable members.

11. In an apparatus relating to photography, means for holding a book in an open position, means associated therewith for holding a leaf of the book at an angle with relation to the position of the book when open, means for reflecting both sides of the said page, means for projecting the reflected matter, means for moving the device for holding the book toward or from the means for projecting the reflected page, and a sensitized element on to which the reflected matter is projected.

12. In an apparatus relating to photography, means for holding a book in an open position, means associated therewith for holding a leaf of the book at an angle with relation to the position of the book when open, means for reflecting both sides of the said page, means for projecting the reflected page, means for containing the sensitized material with which the means for projecting the reflected matter operates, and means for moving the device for holding the book toward or from the means for projecting the reflected page.

13. In a photographing and developing apparatus, a light tight chamber, means for supporting a sensitized film therein so that picture areas on opposite sides of the film are free, means for holding a sheet to expose opposite sides thereof, means for focusing light rays from one side of the sheet to one side of the film, means for focusing light rays from the opposite side of the sheet on to the opposite side of the film, means within the casing for holding a member against which light is projected for determining the focus and an element removably attached to the casing, the removal of which opens the light tight casing to permit a view of the member.

14. In an apparatus relating to photography, means for holding a book in an open position, members movable across the open face of a book, and adapted to hold a leaf of the book therebetween, means for reflecting the sides of the leaf held between the movable members, and means for moving the device for holding the book toward or from means for projecting the reflected page.

15. In a device relating to photography, a support, members movable thereon and adapted to clamp a copy therebetween, means for reflecting the two sides of the copy so held, means for projecting the reflected page, means for supporting the projecting means on a plane above the edge of the page, and means coacting with the projecting means whereby a film is subjected to light through the projecting means.

16. In a machine relating to photography, an exposing chamber having means for feeding film therethrough, reflectors within the exposing chamber for directing light to the two sides of the film, means for removably retaining the reflectors in place, an image projecting means associated with the exposing chamber, means within the exposing chamber against which light is projected for focusing, means for holding the last mentioned means in the exposing chamber, said exposing chamber having provision for viewing the means against which light is projected.

17. In a machine relating to photography, an exposing chamber having means for feeding film therethrough, reflectors within the exposing chamber for directing light to the two sides of the film, means for removably retaining the reflectors in place, flanges within the exposing chamber, glass plates partially held by the flanges between which the film is exposed, and means associated with the flanges for holding the glass plates.

In testimony whereof, I hereunto affix my signature in the presence of two witnesses.

GEORGE C. BEIDLER.

Witnesses:
LOTTIE E. BARKLEY,
P. A. PUTNAM.